United States Patent [19]

Ludwig

[11] 4,451,720

[45] May 29, 1984

[54] DEVICE FOR MOUNTING AN ELECTRIC DEVICE, IN PARTICULAR A CAM SWITCH ON A MOUNTING PLATE

[75] Inventor: Bernd Ludwig, Marienheide, Fed. Rep. of Germany

[73] Assignee: Starkstrom Gummersbach GmbH, Marienheide, Fed. Rep. of Germany

[21] Appl. No.: 418,403

[22] Filed: Sep. 15, 1982

[30] Foreign Application Priority Data

Sep. 15, 1981 [EP] European Pat. Off. ........ 81107259.4

[51] Int. Cl.³ .............................................. H01H 9/02
[52] U.S. Cl. ................................... 200/296; 200/295; 248/27.3
[58] Field of Search ............... 200/295, 296, 293, 294, 200/297, 303, 304, 307, 334, 335; 248/27.1, 27.3; 411/530, 511; 339/125 R, 126 Q, 129; 24/191, 261 R, 223, 224; 285/DIG. 22, 319; 403/256, 247

[56] References Cited

U.S. PATENT DOCUMENTS

| | | | |
|---|---|---|---|
| 2,272,688 | 2/1942 | Catron | 200/296 X |
| 2,744,185 | 5/1956 | Cawley | 248/27.3 X |
| 3,131,896 | 5/1964 | Ingraham | 248/27.3 |
| 3,178,522 | 4/1965 | Passarelli, Jr. | 200/295 X |
| 3,271,052 | 9/1966 | Waters | 285/319 |
| 3,312,807 | 4/1967 | Manecke | 200/295 |
| 3,314,696 | 4/1967 | Ferguson et al. | 285/DIG. 22 |
| 3,828,291 | 8/1974 | Urani | 200/296 X |
| 4,208,558 | 6/1980 | Alsch | 200/296 |
| 4,249,057 | 2/1981 | Schlegel et al. | 200/296 |
| 4,262,181 | 4/1981 | Tufano et al. | 200/296 |
| 4,306,123 | 12/1981 | Taylor | 200/307 X |

FOREIGN PATENT DOCUMENTS 650076 10/1962 Canada ............................... 339/129

*Primary Examiner*—Stephen Marcus
*Assistant Examiner*—Ernest G. Cusick
*Attorney, Agent, or Firm*—Michael J. Striker

[57] ABSTRACT

Electric devices, like control and signal devices, in particular cam switches are mounted individually or in rows adjacent to each other and/or superimposed with respect to each other in bores of a mounting plate.

In order to provide a device which is very simply constructed, simple to manipulate and which is usable for different embodiments of devices and lengths of devices it is suggested that a coupling plate with a spring clip is mounted on the front end of the device facing the mounting plate, and that an insert housing is provided which can be inserted from the outside through a bore and which is provided with a retaining device cooperating with the edge of the bore, and including actuating means cooperating with the spring of the coupling plate.

6 Claims, 9 Drawing Figures

DEVICE FOR MOUNTING AN ELECTRIC DEVICE, IN PARTICULAR A CAM SWITCH ON A MOUNTING PLATE

BACKGROUND OF THE INVENTION

The invention relates to a device for mounting an electric device, in particular a cam switch on a mounting plate which is provided with a bore.

It is a common technology that electric devices are mounted individually or mostly in rows adjacent to each other and/or superimposed to each other on mounting plates so that a part of the device with the operating or indicating elements protrudes from the front side of the mounting plate, while the actual switch part of the device with the electrical connections and the wiring is mounted on the rear side of the mounting plate. The devices discussed here are called control and signal devices in the technical world. The use of cam switches is preferred here. Naturally, mounting plates are provided in control panels, but they may also be designed as free standing wall plates or as a plate of a switch desk. Numerous structures are available for mounting electrical devices on such mounting plates. Normally, the devices are guided through the bore of the mounting plate and thereafter screwed together with the mounting plate. However, this is very expensive, cumbersom and time consuming because two persons are required for these operations on large mounting plates, namely one person who guides the device from the front side through the bore of the mounting plate and another person which takes care of the mounting on the rear side of the mounting plate. For example, these are structures wherein the device essentially consists of two parts which can be connected with each other with a bayonet lock. However, these known devices are also very expensive structurally and operationally.

SUMMARY OF THE INVENTION

In contrast thereto, it is an object of the invention to provide a device which is simply structured, simply manipulated and which is usable for different embodiments and device lengths.

This object of the invention, based on the aforementioned explained device, is obtained in that a coupling plate with a spring is mounted on the front end of the device facing the mounting plate, and that an insert housing is provided which can be inserted from the outside through the bore and which is provided with a click-stop device cooperating with the edge of the bore, on the one hand, and with the spring of the coupling plate, on the other hand.

Advantageous embodiments of the invention can be seen from the subclaims.

DETAILED DESCRIPTION OF THE PREFERRED EMBODIMENTS

Figure 3:
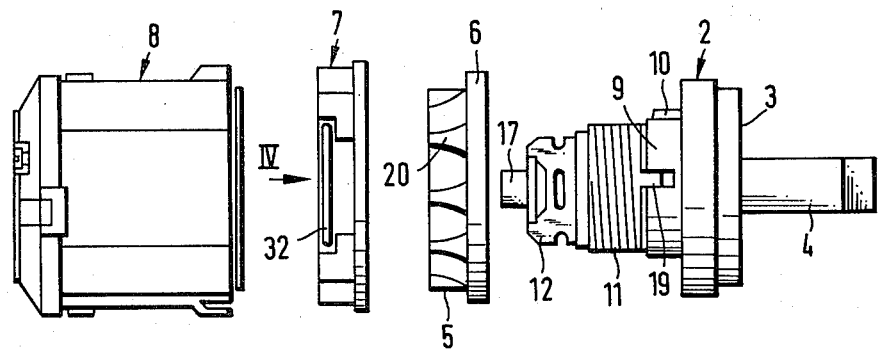
FIG. 3 a plan view on the device in accordance with FIG. 1, whereby the individual structural parts are illustrated in a distance from each other, FIG. 4 a view in accordance with arrow IV in FIG. 3 in an enlarged scale, FIG. 5 a vertical section through the clamp screw in accordance with FIG. 3 in an enlarged scale, FIG. 6 a side view of a single part in an enlarged scale.

The FIGS. show one exemplified embodiment of a device in form of a cam switch which is mounted on a mounting plate 1. For this purpose, an insert housing 2 is provided which will be explained in detail further below in conjunction with FIG. 6. An actuating handle 4 is provided on the front face 3 of insert housing 2 which is connected with a four cornered shaft 17 (FIG. 3) and whereby this shaft extends into the actual device 8 in known manner transmitting the rotating movement of the actuating handle, thus triggering the change of the switch position.

Figure 1:
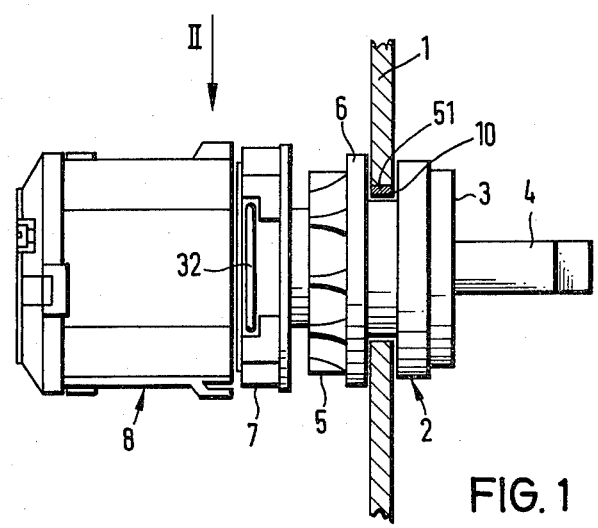
FIG. 1 is a plan view of a device mounted on a mounting plate.
Figure 2:
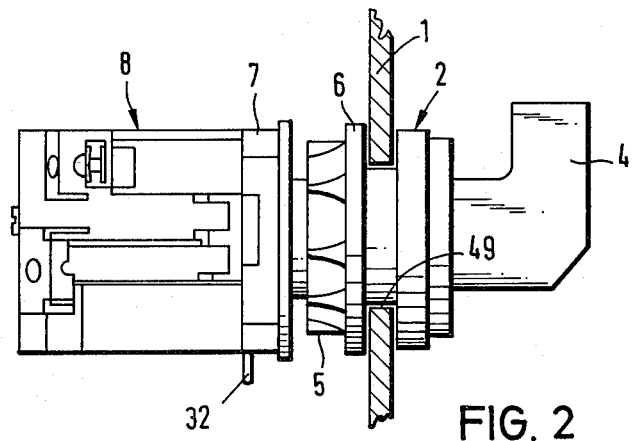
FIG. 2 a side view in accordance with arrow II in FIG. 1.
Figure 6:
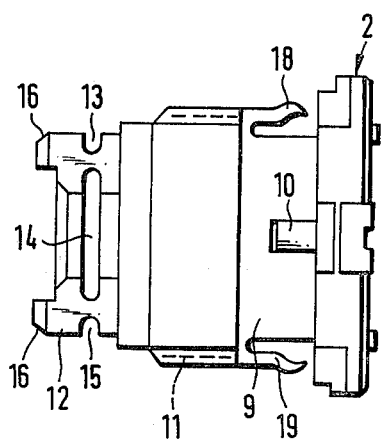

The insert housing 2 is guided through the bore 49 of the mounting plate from the right side, that is, from the visible outer side of the mounting plate 1 in such a manner that at one time a rib 10 engages into a notch 51 at the edge of the bore, so that the device is retained twist proof, in accordance with FIGS. 1 and 2. As shown in FIG. 6, the insert housing is provided on its periphery with a resilient retaining device in the form of spring blades 18, 19 which are somewhat compressed inwardly during the insertion in bore 49, whereby they can then yield freely to the outside in the correct position of the insert housing and engage behind the edge of bore 49, thereby assuring a definite position of the insert housing in the bore in cooperation with rib 10. The assembler, who is supposed to mount a large number of devices on a mounting plate can insert a corresponding number of insert housings from the front side of the mounting plate into the rows of provided bores in this manner. Without hesitation, he can then go to the rear side of the mounting plate, without being concerned that the given insert housings become detached from their positions due to shocks, or the like.

Figure 5:
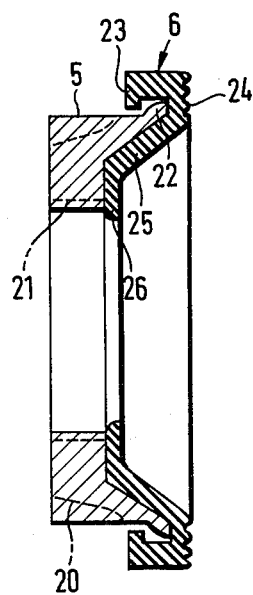

Thereafter, a clamping screw 5 is screwed onto the inner side of the mounting plate, whereby this clamping screw is provided with an inner thread 21, in accordance with FIG. 5, which is engageable with an outer thread 11 of the insert housing. To facilitate a manual screwing, the clamp screw 5 is provided with outer radially extending ribs 20. On the one front end which faces towards the mounting plate 1, the clamp screw is provided with a circular extending shoulder 22 over which a rubber ring 6 engages with a U-shaped ring part 23. The rubber ring is provided with an inwardly extending conical engagement part 25 with which the ring engages on a correspondingly conical bevelled face of the clamp screw. In FIG. 5, the inner edge 26 is shown in an exaggerated manner extending forwardly to the inside. However, this should clarify that this inner edge is squeezed out to the inside when the clamp screw is in a firm screwed position, thus snugly engaging the insert housing in a sealing manner. Furthermore, the rubber ring 6 assures a sealing with respect to the mounting plate 1. For this purpose, the engagement face of the rubber ring is provided with circular shaped ribs 24.

Figure 4:
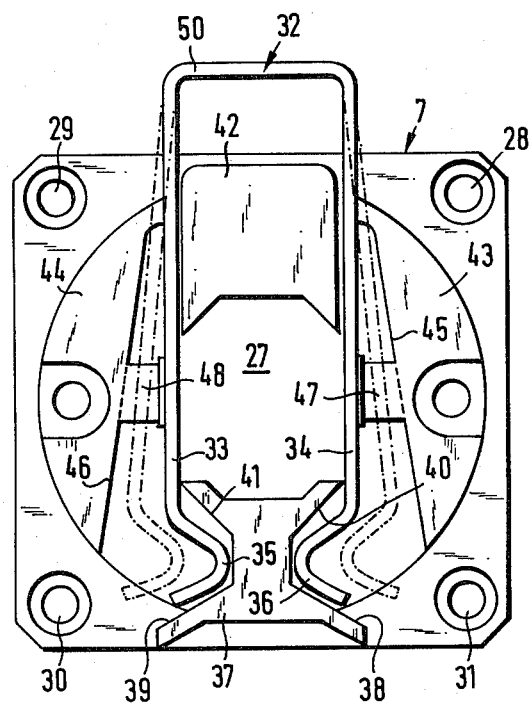

After the insert housing 2 is finally mounted, that means in a manner which permits to dismantle this mounting rapidly with a few manipulations, one can start with the mounting of the actual electric device 8. For this purpose, a coupling plate 7 is screwed on the front face of device 8 facing the mounting plate which essentially is square shaped with rounded off corners and which is provided with a larger recess 27 in its center. FIG. 4 illustrates this coupling plate in an enlarged scale in the view in accordance with arrow IV in FIG. 3. Four bores 28, 29, 30 and 31 are provided in the proximity of the corners of the coupling plate 7 which normally are not required. However, if the device 8 is assembled from a larger number of structural parts and has a large length in contrast to FIG. 1 one can guide screw bolts through these bores and, if need be, through further corresponding bores, not shown, of the structural parts of device 8, thus providing an additional screwing and mounting.

According to one feature of this invention, on the side of the coupling plate 7, shown in FIG. 4, an essentially U-shaped spring clip 32 is mounted and guided. The center yoke 50 of spring 32 clip extends to a certain degree from the coupling plate 7, so that one can engage with a screw driver or another suitable tool under the yoke and to remove the spring clip 32 a little bit out of the coupling plate, for example. Alternatively, one can push onto yoke 50 and displace the spring to a certain degree into the coupling plate 7. In both cases a straddling of the two shanks 33 and 34 of the spring clip 32 occurs to the outside up to the dash-dotted drawn location, whereby one must visualize that the dash-dotted shanks are displaced accordingly corresponding to the inward or outward displacement with yoke 50. Thereby, the shanks 33, 34 of spring clip 32 are guided in slots beneath lugs 47 and 48. So that this aforementioned straddling of the spring shank can occur, the spring shanks are bent inwardly in the proximity of their ends. These inwardly bent parts 35, 36 cooperate with an X-shaped guide shoulder 37 which is provided on both sides with bevelled faces 38 and 39 or 40 and 41. When the spring clip is pushed downwardly by the pressure on yoke 50 the inwardly bent spring parts 35, 36 slide along the bevelledfaces 39 and 38 and the spring shanks are forced to straddle. Reversely, when pulling yoke 50 of spring clip 32 upwardly a straddling of the shanks of the spring is executed by sliding of the spring parts 35, 36 on sliding faces 41 and 40. An inner guide piece 42 as well as two outer guide pieces 43 and 44 are provided for a better guiding and support, and above all for limiting the straddling range of the spring shanks, whereby these guide pieces are made unitary with the coupling plate 7. The outer guide pieces 43, 44 have bevelled engagement faces 45, 46 against which the spring shank can abut in their outermost straddle position.

The connecting part 12 of the insert housing 2 cooperates with the coupling plate 7. While the shoulder 9 of the insert housing is designed cylindrically corresponding to the bore 49 in the mounting plate 1, the connecting part 12 is designed multi-cornered, so as to assure a twist proof connection to device 8, and whereby this multi-cornered connection part 12 is synchronized to the contours of recess 27 in coupling plate 7. Furthermore, this connecting part 12 is provided with about semicylindrical notches 13, 14 and 15. A fourth notch, which extends parallel with notch 14, may be provided on the other side of connecting part 12, as shown in accordance with FIG. 6. The spring shanks 33, 34 engage into the opposite located notches into an arresting position. When, as already mentioned, four notches are provided and when the connecting part 12 is synchronized to the recess 27, it may be possible to carry out the coupling of coupling plate and device 8, on the one hand, and the insert housing 2, on the other hand, in two defined positions which are offset with each other by 90°. Bevels 16 are provided on the front face to facilitate the insertion of the coupling plate 7 on the connecting part 12. It should also be noted that the four cornered shaft 17 can be designed substantially longer with respect to FIG. 3, so that it can extend further into device 8.

Figure 7:
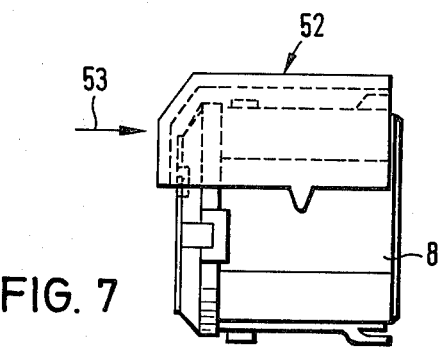
FIG. 7 is a view of a single part with placed upon touch protection lid, FIG. 8 a side view of the touch protection lid and FIG. 9 a plan view on the touch protection lid.
Figure 8:
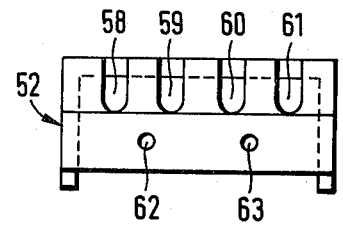
Figure 9:
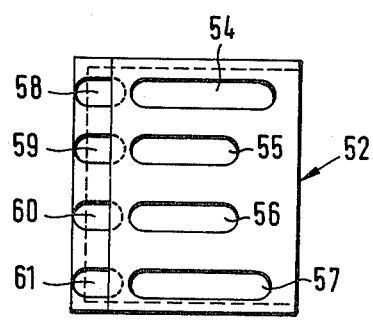

Finally, FIGS. 7 to 9 illustrate an advantageous embodiment of the invention which also contribute to a substantial facilitation for mounting the device, in that the actual device 8 with its numerous contact connecting screws and connecting locations, not shown in detail, are made touch safe for the electrical wiring, whereby the mounting of the electrical wiring is simplified, at the same time. For this purpose, a touch protection lid 52 is placed on the device 8 above the area of the contact connecting screws and the connecting contact locations for the electrical wiring, and the placing of the protection lid is advantageously performed in the direction of arrow 53 in FIG. 7. The touch protection lid 52 is essentially U-shaped, so that the underside and the right front face are open in the illustration of FIG. 7. Longitudinal openings 54, 55, 56 and 57 are provided on the upper side through which the wiring is pushed. In accordance with FIG. 8, further openings 58, 59, 60 and 61 are provided on the front face of the touch protecting lid which serve to guide a screw driver therethrough and simultaneously for guiding a screw driver, so that one can reach the contact connecting screws. The bores 62 and 63 serve for guiding mounting screws therethrough for the touch protection lid.

What is claimed as new and desired to be protected by Letters Patent is set forth in the appended claims.

I claim:

1. Device for mounting an electric apparatus, in particular a switch, on a mounting plate which is provided with a bore, comprising a coupling plate provided with a spring clip, said spring clip being displaceable either out of the coupling plate or into the coupling plate, said coupling plate being secured to a part of the apparatus facing the mounting plate; an insert housing insertable through said bore, said housing including actuating means for controlling said apparatus, said actuating means having a connecting part inserted through the bore provided on its outside with notches; said spring clip when displaced into the coupling plate being engageable with said notches, and said housing being provided with a resilient retaining device connectable to the edge of the bore.

2. Device in accordance with claim 1, wherein said spring clip is essentially U-shaped to define a center yoke and two shanks, said yoke projecting beyond the edge of said coupling plate, said shanks in the proximity of their ends, having inwardly bent parts; said coupling plate being formed with an X-shaped guide having bevelled faces cooperating with said bent parts of the spring clip in such a manner that during manual displacement of the yoke either away from the coupling plate or towards the coupling plate, said shanks are straddled from each other and disengage said connecting part of the actuating means.

3. Device in accordance with claim 2, wherein said shanks engage or disengage the notches in said connecting part of the actuating means.

4. Device in accordance with claim 3, wherein the retaining device of insert housing is formed with two opposite spring blades which engage a notch on the outer edge of said bore, the circumference of said insert housing having a rib which is offset by about 90° with respect to the spring blades when the latter engage into said notch at the edge of the bore.

5. Device in accordance with claim 4, wherein the insert housing is provided with an outer thread on which a clamp screw is screwed, and the clamp screw is provided with a rubber ring which is designed in such a manner that a sealing is established between the insert housing and the inner face of the mounting plate.

6. Device in accordance with claim 5, wherein a touch protecting lid is placed upon the apparatus, said lid being provided with openings for a screw driver and with longitudinal openings for leading through electrical wiring.

* * * * *